United States Patent [19]

Takeda et al.

[11] Patent Number: 5,529,040
[45] Date of Patent: Jun. 25, 1996

[54] CONTROL DEVICE FOR AN INTERNAL COMBUSTION ENGINE

[75] Inventors: Yuji Takeda; Hidemi Senda, both of Toyota, Japan

[73] Assignee: Toyota Jidosha Kabushiki Kaisha, Toyota, Japan

[21] Appl. No.: 358,565

[22] Filed: Dec. 14, 1994

[30] Foreign Application Priority Data

Dec. 29, 1993 [JP] Japan .................................. 5-354658

[51] Int. Cl.⁶ ...................................................... F02P 5/14
[52] U.S. Cl. ...................................................... 123/425
[58] Field of Search .................................. 123/425, 416, 123/417, 419, 422, 423

[56] References Cited

U.S. PATENT DOCUMENTS

| | | | |
|---|---|---|---|
| 4,376,429 | 3/1983 | Youngblood | 123/425 |
| 4,711,200 | 12/1987 | Kinoshita | 123/492 |
| 4,727,841 | 3/1988 | Hirose | 123/425 |
| 4,825,836 | 5/1989 | Hirose | 123/478 |
| 5,131,369 | 7/1992 | Kanehiro et al. | 123/425 |
| 5,131,370 | 7/1992 | Chikamatsu et al. | 123/425 |
| 5,411,000 | 5/1995 | Miyashita et al. | 123/425 |

FOREIGN PATENT DOCUMENTS

| | | |
|---|---|---|
| 58-51241 | 3/1983 | Japan . |
| 58-51242 | 3/1983 | Japan . |
| 59-128941 | 7/1984 | Japan . |
| 59-170430 | 9/1984 | Japan . |
| 59-200042 | 11/1984 | Japan . |
| 59-201950 | 11/1984 | Japan . |
| 61-108847 | 5/1986 | Japan . |

*Primary Examiner*—Raymond A. Nelli
*Attorney, Agent, or Firm*—Kenyon & Kenyon

[57] ABSTRACT

The present invention controls ignition timing appropriately while an increment correction of the fuel injection amount is implemented. A control device of the invention determines a retard angle based on a difference between a prior increment factor, which is determined prior to an actual increment of the fuel injection amount in response to loading of the engine and an OTP fuel increment correction factor for determining the actual increment of the fuel injection amount. The engine load may be determined by intake air quality and rotating speed. When the increment correction is delayed for a fixed time period, the structure of the invention effectively prevents the ignition timing from being retarded excessively due to frequent knocking at the beginning of the delay time. This accordingly prevents the ignition timing from being maintained in the retarding condition to undesirably lower the power of the engine when the delay time has elapsed and an actual increment of the fuel injection amount has been executed. In the ignition timing control of the invention, an increase in retard angle immediately affects the ignition timing control while a decrease in retard angle slowly affects the ignition timing control. This allows the ignition timing to be controlled appropriately without undesirable delay.

15 Claims, 12 Drawing Sheets

Fig. 13

| ADDRESS | α | α+1 | α+2 | α+3 | α+4 | α+5 |
|---|---|---|---|---|---|---|
| DATA [°CA] | 2 | 0 | 1 | 2 | 5 | 7 |
| CORRECTION FACTOR | 1.0 | 1.1 | 1.2 | 1.3 | 1.4 | 1.5 |

CONTROL DEVICE FOR AN INTERNAL COMBUSTION ENGINE

BACKGROUND OF THE INVENTION

1. Field of the Invention

The present invention relates to a device for controlling an internal combustion engine as well as to a method of controlling the same. More specifically, the present invention relates to a device for and a method of controlling ignition timing when a richer air/fuel ratio is temporarily required.

2. Description of the Related Art

OTP (Over Temperature Protection) fuel increment control is generally implemented for preventing overheating of an exhaust system under high-loading and high-temperature conditions of an internal combustion engine (see for example, JAPANESE PATENT LAYING-OPEN GAZETTE No. S59-201950). Although the temperature of the internal combustion engine is generally determined by detecting the temperature of cooling water, the OTP fuel increment control detects operating conditions of the internal combustion engine and increases the fuel injection amount prior to detection of an increase in temperature of cooling water. When an accelerator pedal is depressed to place a throttle valve in a position exceeding a predetermined level, the OTP control system anticipates the high-loading and high-rotating speed operation of the internal combustion engine, which causes an increase in the temperature of the internal combustion engine, and increases the fuel injection amount.

The conventional OTP control system can prevent the undesirable temperature increase of the internal combustion engine and the exhaust system. The temperature of the internal combustion engine and the exhaust system does not, however, actually rise immediately after the operating condition of the internal combustion engine reaches a specific level. A proposed improvement of the OTP control accordingly does not execute the increment control immediately after the internal combustion engine is placed under the operating condition which leads to the high-loading and high-temperature condition, but increases the fuel injection amount after a predetermined delay time.

A knock control system has also been proposed, wherein a knock sensor for detecting knocking is mounted on the internal combustion engine. The knock control system advances the ignition timing by a certain degree when knocking is not detected for a certain time period whereas it retards the ignition timing by a certain degree when knocking is detected, thereby enhancing the power of the internal combustion engine. When the operating condition of the internal combustion reaches a predetermined level requiring an increment control of the fuel injection amount and the increment control of the fuel injection amount is implemented after a predetermined delay time, knocking is frequently observed during the delay time when the engine is under the high-loading condition. The ignition timing is then corrected in the retarding direction by the knock control.

The conventional control system, however, can not control the ignition timing appropriately at the start of the increment correction of the fuel injection amount after elapse of the predetermined delay time. The increment correction of the fuel injection amount after the predetermined delay time effectively reduces knocking and regulates the ignition timing in the advancing direction. The ignition timing control with the knock sensor repeats the correction of the ignition timing by a certain degree in the advancing direction when no knocking is observed for a certain time period. Such control causes a time lag between the actual reduction of knocking and the advance of the ignition timing to an appropriate level.

SUMMARY OF THE INVENTION

An object of the invention is thus to control ignition timing appropriately while an increment correction of the fuel injection amount is implemented.

The invention is directed to a control device disposed in an internal combustion engine for detecting an operating condition of the internal combustion engine and providing a richer air/fuel ratio after a delay of a fixed time period when the operating condition thus detected reaches a predetermined level. The control device of the invention includes:

operation means for determining a parameter representing a difference between probabilities of knocking before and after the fixed time period; and ignition timing retarding means for controlling ignition timing during the fixed time period in a retarding direction based on the parameter determined by the operation means.

The parameter representing the difference between probabilities of knocking may be a difference between air/fuel ratios before and after the control executed by the ignition timing retarding means or alternatively a difference between knocking-frequencies before and after the control executed by the ignition timing retarding means. According to a preferable application, the control device further includes retard angle limiting means for setting a threshold of the parameter-based retard angle control executed by the ignition timing retarding means. This effectively prevents excessive power drop of the internal combustion engine.

A knocking control function may be added to the control device of the invention. In such a structure, the control device further includes:

knocking detection means for detecting knocking generated in the internal combustion engine; and knocking control means, which functions independent of the ignition timing retarding means, for controlling the ignition timing of the internal combustion engine based on a frequency of the knocking detected by the knocking detection means.

The knocking control means may further include:

first means for controlling the ignition timing, based on the parameter determined by the operation means, in the retarding direction at a predetermined first speed at a start of the fixed time period; and second means for controlling the ignition timing, based on the parameter determined by the operation means, in an advancing direction at a predetermined second speed, which is slower than the predetermined first speed, at an end of the fixed time period. This structure varies the control rate of the ignition timing at the start and the end of the fixed time period, thereby realizing appropriate ignition timing without undesirable delay.

The invention is also directed to a method of controlling an internal combustion engine by detecting an operating condition of the internal combustion engine and providing a richer air/fuel ratio after a delay of a fixed time period when the operating condition thus detected reaches a predetermined level. The method includes the steps of:

(a) determining a parameter representing a difference between probabilities of knocking before and after the fixed time period; and (b) controlling ignition timing during the fixed time period in a retarding direction based on the parameter determined in the step (a).

According to a preferable application, knocking control is combined with the above control. In such a case, the method further includes the steps of:

(c) detecting knocking generated in the internal combustion engine in a period other than the fixed time period; and (d) controlling the ignition timing of the internal combustion engine based on a frequency of the knocking thus detected.

The step (d) further includes the steps of:

(d-1) controlling the ignition timing, based on the parameter determined in the step (a), in the retarding direction at a predetermined first speed at a start of the fixed time period; and (d-2) controlling the ignition timing, based on the parameter determined in the step (a), in an advancing direction at a predetermined second speed, which is slower than the predetermined first speed, at an end of the fixed time period.

When a temporary increment of the fuel injection amount into the internal combustion engine is required and that control for providing a richer air/fuel ratio is delayed, the control device of the invention controls the ignition timing during the delay time in the retarding direction based on the parameter determined by the operation means. This parameter represents a difference between probabilities of knocking before and after the delay time during which regulation of the air/fuel ratio to a richer state is delayed. The control based on the parameter can appropriately regulate the ignition timing of the internal combustion engine. The parameter-based control may be combined with the knocking control.

The appropriate control of the ignition timing reduces transient knocking in the increment control of the fuel injection amount, thus preventing an uncomfortable feeling for the driver. The structure of the invention can effectively prevent excessive retard angle control after elapse of the delay time of the increment correction, thereby realizing favorable power control and improving the fuel consumption rate. The control of the invention is free from the drawback of the conventional control, that is, the increase in exhaust temperature due to the excessive retard angle control, and can accordingly set a longer delay time prior to actual increment correction or otherwise reduce the increment after elapse of the delay time while sufficiently protecting the exhaust-related elements. This results in further improvement of the fuel consumption rate.

These and other objects, features, aspects, and advantages of the present invention will become more apparent from the following detailed description of the preferred embodiments with the accompanying drawings.

BRIEF DESCRIPTION OF THE DRAWINGS

FIG. 13 shows the relationship between the increment correction factor and the retard angle data.

DESCRIPTION OF THE PREFERRED EMBODIMENT

Figure 1:
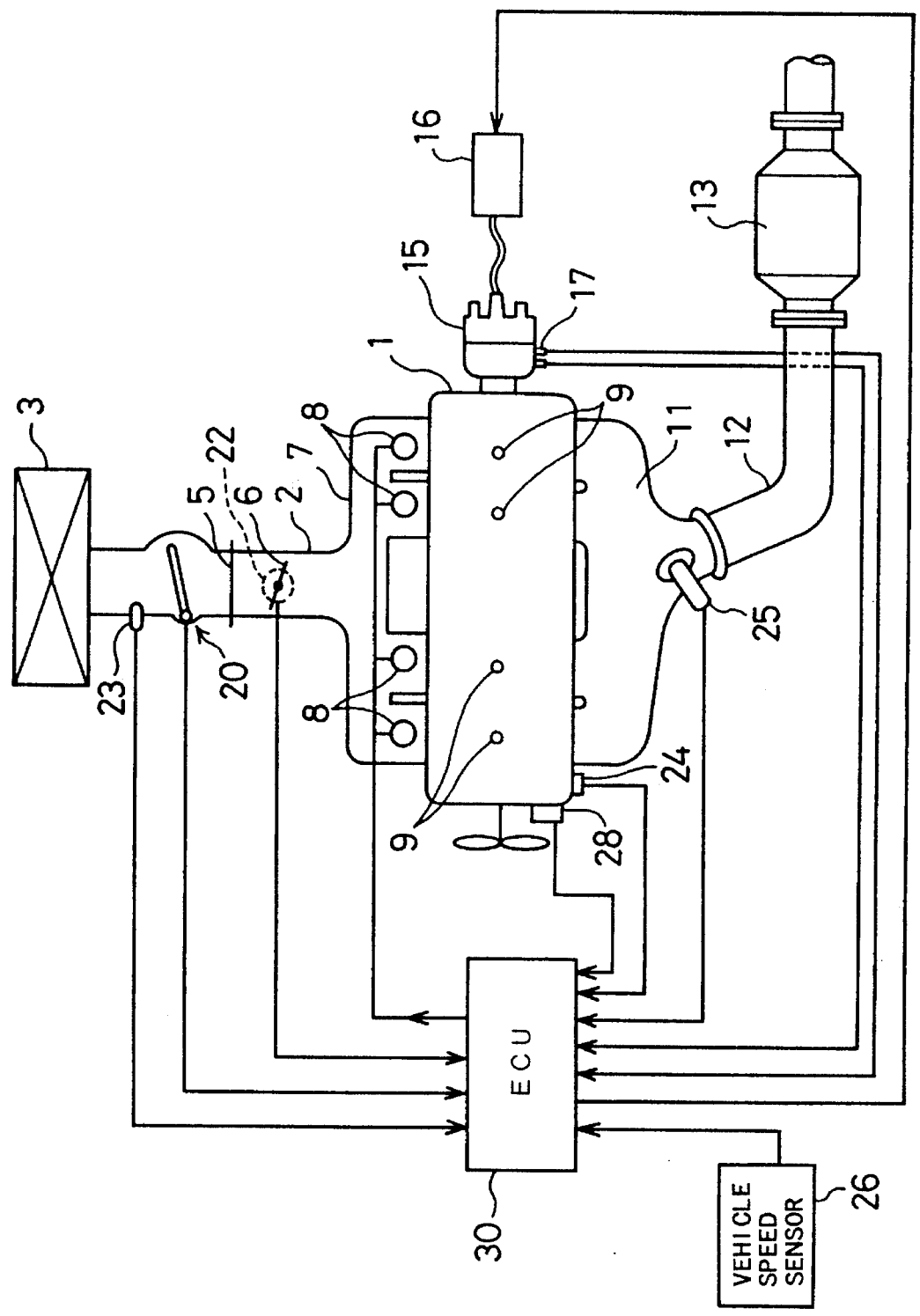
FIG. 1 schematically shows a control device disposed in an internal combustion engine 1 for controlling fuel injection and ignition timing as a first embodiment according to the invention.

As illustrated in FIG. 1, an air cleaner 3, a throttle chamber 5, a throttle valve 6, and an intake manifold 7 for feeding the air into each cylinder of an engine 1 are disposed in an intake conduit 2 of the engine 1 leading from an inlet of intake air. Engine 1 has four cylinder. A plurality of fuel injection valves 8 are mounted at respective cylinder entrances of the intake manifold 7 for injecting fuel in each cylinder independently of the other cylinders.

Intake air fed into each cylinder via the intake manifold 7 is mixed with fuel injected from each fuel injection valve 8. A mixture of fuel and air is ingested by a combustion chamber of each cylinder and ignited by a plurality of ignition plugs 9 in the combustion chamber to drive the engine 1 through explosion and combustion of the air/fuel mixture. An exhaust gas generated by combustion of the air/fuel mixture in the combustion chamber is led through an exhaust manifold 11 and an exhaust conduit 12 to a catalytic converter 13, which processes the exhaust gas with a catalyst and discharges the processed exhaust to the atmosphere.

A high voltage from an igniter 16 is applied onto the plurality of ignition plugs 9 via a distributor 15 at a predetermined timing synchronous with rotation of the engine 1. The distributor 15 functions to distribute the high voltage generated by the igniter 16 to the plurality of ignition plugs 9 of the respective cylinders. The distributor 15 has a rotating speed sensor 17 for outputting 24 pulse signals at every rotation.

The engine 1 is further provided with various sensors for detecting operating conditions of the engine 1 other than the rotating speed sensor 17. These sensors include an air flowmeter 20 disposed above the throttle valve 6 for detecting the amount of air intake, a throttle position sensor 22 for detecting the position of the throttle valve 6, an intake air temperature sensor 23 arranged in the intake conduit 2 for detecting the temperature of the intake air, a water temperature sensor 24 placed in the cylinder block for detecting the temperature of cooling water, an oxygen sensor 25 disposed in the vicinity of an outlet of the exhaust manifold 11 for detecting the concentration of oxygen in the exhaust gas, a vehicle speed sensor 26 for detecting a speed V of the vehicle, a knock sensor 28 for detecting knocking generated in the engine 1. The throttle position sensor 22 includes an idle switch 21 (see FIG. 2) for detecting the full-closed condition of the throttle valve 6.

Figure 2:
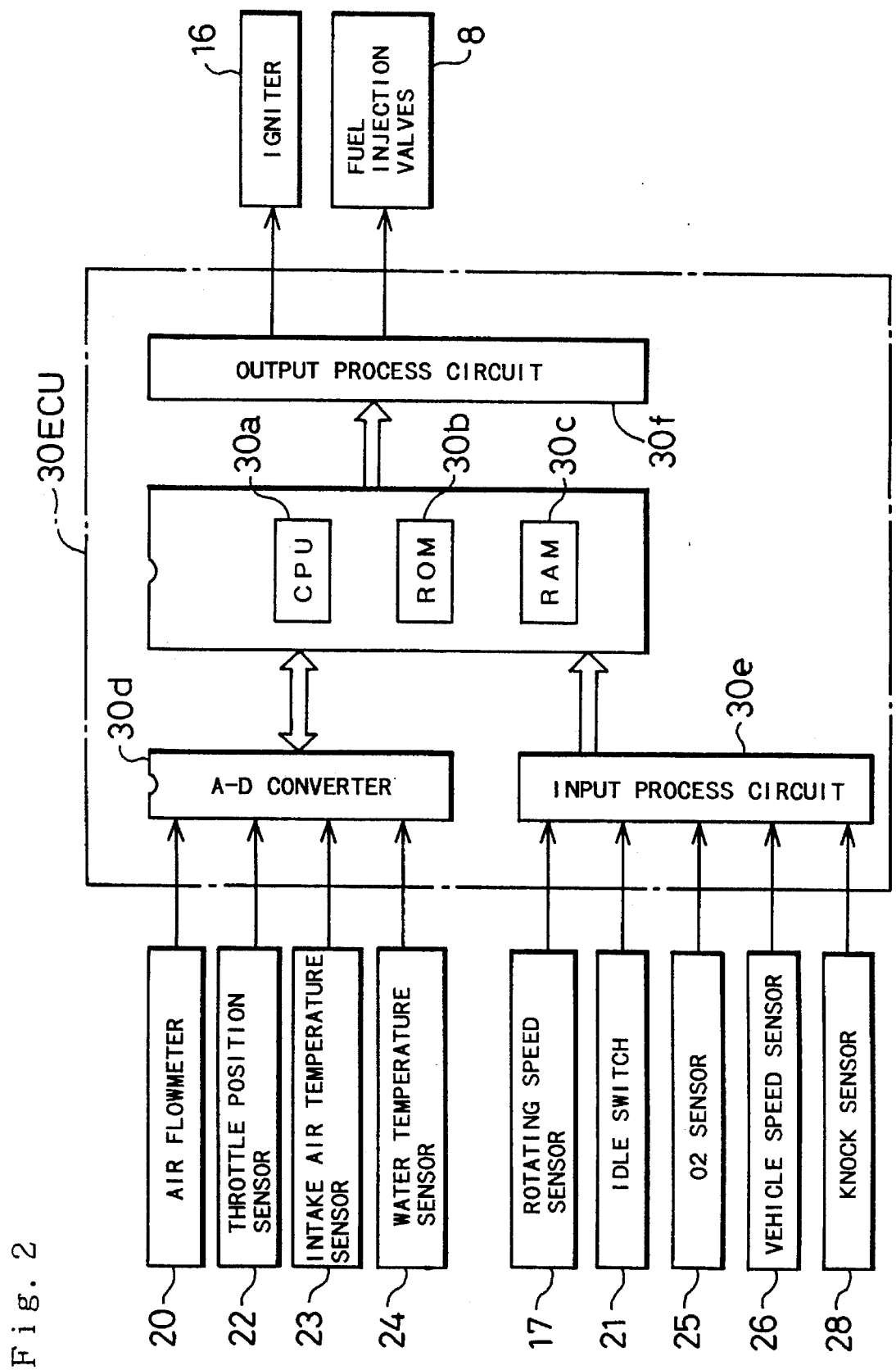
FIG. 2 is a block diagram showing the typical structure of all ECU 30.

An electronic control unit (hereinafter referred to as ECU) 30 receives detection signals sent from the various sensors mentioned above. Referring to FIG. 2, the ECU 30 is constructed as a logic/operation circuit including a microcomputer. The ECU 30 includes a CPU 30a for executing various operations according to preset control programs to control the engine 1, a ROM 30b in which control programs and control data required for execution of the various operations by the CPU 30a were previously stored, a RAM 30c in which a variety of data required for execution of the various operations by the CPU 30a are temporarily written in and read out, an analog-to-digital converter (A-D converter) 30d and an input process circuit 30e for receiving detection signals sent from the various sensors described above, and an output process circuit 30f for outputting driving signals to the igniter 16 and the fuel injection valves 8 based on the results of operations executed by the CPU 30a.

The ECU 30 thus constructed actuates and regulates the igniter 16 and the fuel injection valves 8 based on the operating conditions of the engine 1, so as to control an ignition timing and a fuel injection amount.

Figure 3:
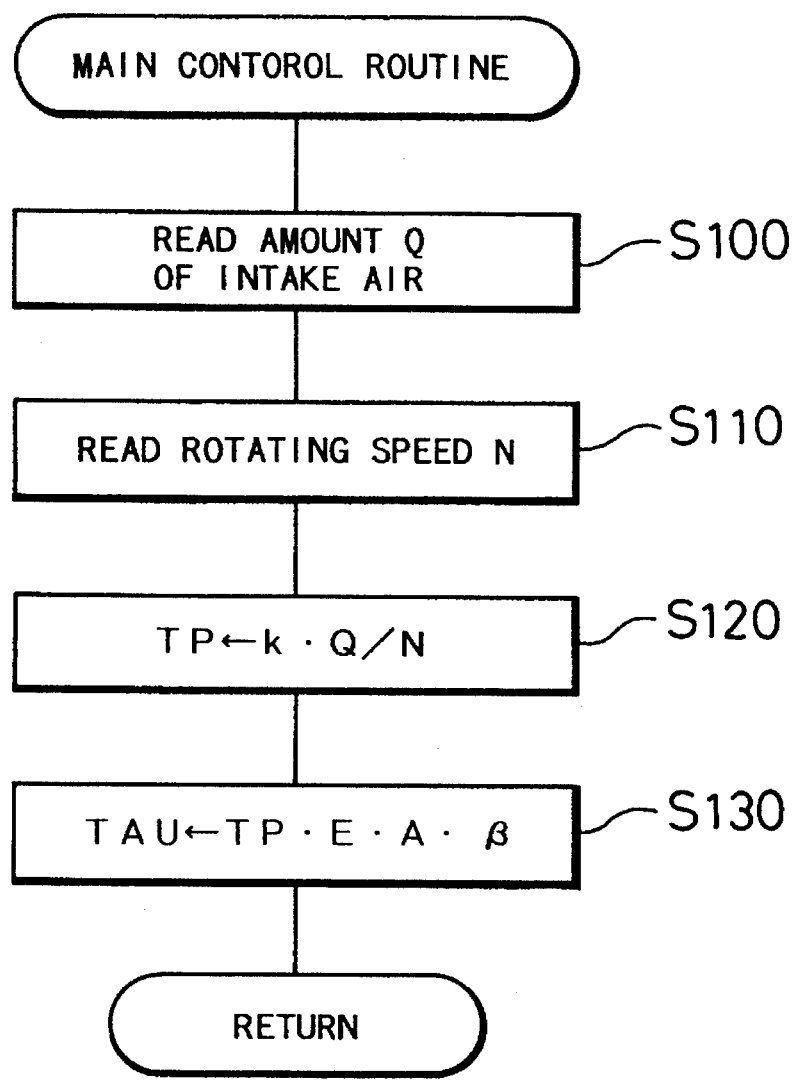
FIG. 3 is a flowchart showing a main control routine for determining an actual amount TAU of fuel injection.

FIG. 3 is a flowchart showing a main control routine executed by the CPU 30a of the ECU 30. The main control routine is executed continuously after the engine 1 is started. When the program enters the main control routine, the CPU 30a first reads an amount Q of intake air out of the RAM 30c at step S100. The intake air amount Q has been previously converted by the A/D converter 30d from a detection signal sent from the air flowmeter 20 and stored in the RAM 30c according to another routine (not shown). At step S110, the CPU 30a then reads a rotating speed N of the engine 1 detected by the rotating speed sensor 17 and taken in via the input process circuit 30e.

The program then proceeds to step S120 at which the CPU 30a determines a reference amount TP of fuel injection by substituting the intake air amount Q and the rotating speed N read at steps S100 and S110 in the following Equation (1):

$$TP = k \cdot Q/N \quad (1)$$

where k is a constant.

Figure 4:
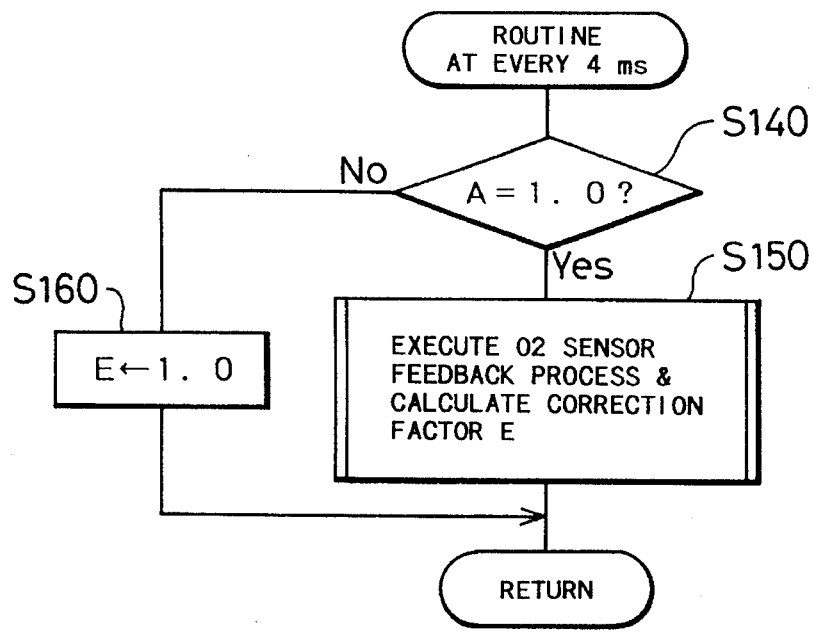
FIG. 4 is a flowchart showing a routine for determining an air/fuel ratio correction factor E.

At step S130, the CPU 30a subsequently determines an actual amount TAU of fuel injection by multiplying the reference amount TP of fuel injection by various correction factors as expressed by:

$$TAU = TP \cdot A \cdot E \cdot \beta \quad (2)$$

where A, E, and $\beta$ respectively represent an OTP fuel increment correction factor, an air/fuel ratio correction factor, and another correction factor. The OTP fuel increment correction factor A takes a fixed value greater than the value '1', for example, 1.2, under high-loading and high-temperature conditions of the engine 1. The air/fuel ratio correction factor E is calculated by an air/fuel ratio feedback control routine shown in the flowchart of FIG. 4. The air/fuel ratio feedback control routine is executed at every 4 milliseconds. When the program enters the feedback control routine, the CPU 30a first determines at step S140 whether the OTP fuel increment correction factor A is equal to the value '1', which allows the air/fuel ratio to be controlled to the stoichiometric ratio. When the stoichiometric ratio is obtainable, the program goes to step S150 at which the CPU 30a executes a feedback process with the oxygen sensor 25 to determine the air/fuel ratio correction factor E. When the stoichiometric ratio is unobtainable, on the contrary, the program goes to step S160 at which the value '1' is substituted in the air/fuel ratio correction factor E. The correction factor $\beta$ may regard a correction of the intake air temperature, a transient correction, or a power voltage correction.

After the actual amount TAU of fuel injection is determined at step S130, the program goes to RETURN and exits from the routine of FIG. 3. Actual fuel injection then implemented when a fuel injection time corresponding to the actual amount TAU of fuel injection determined at step S130 is set on a counter (not shown) for determining an opening time of the fuel injection valve 8.

Figure 5:
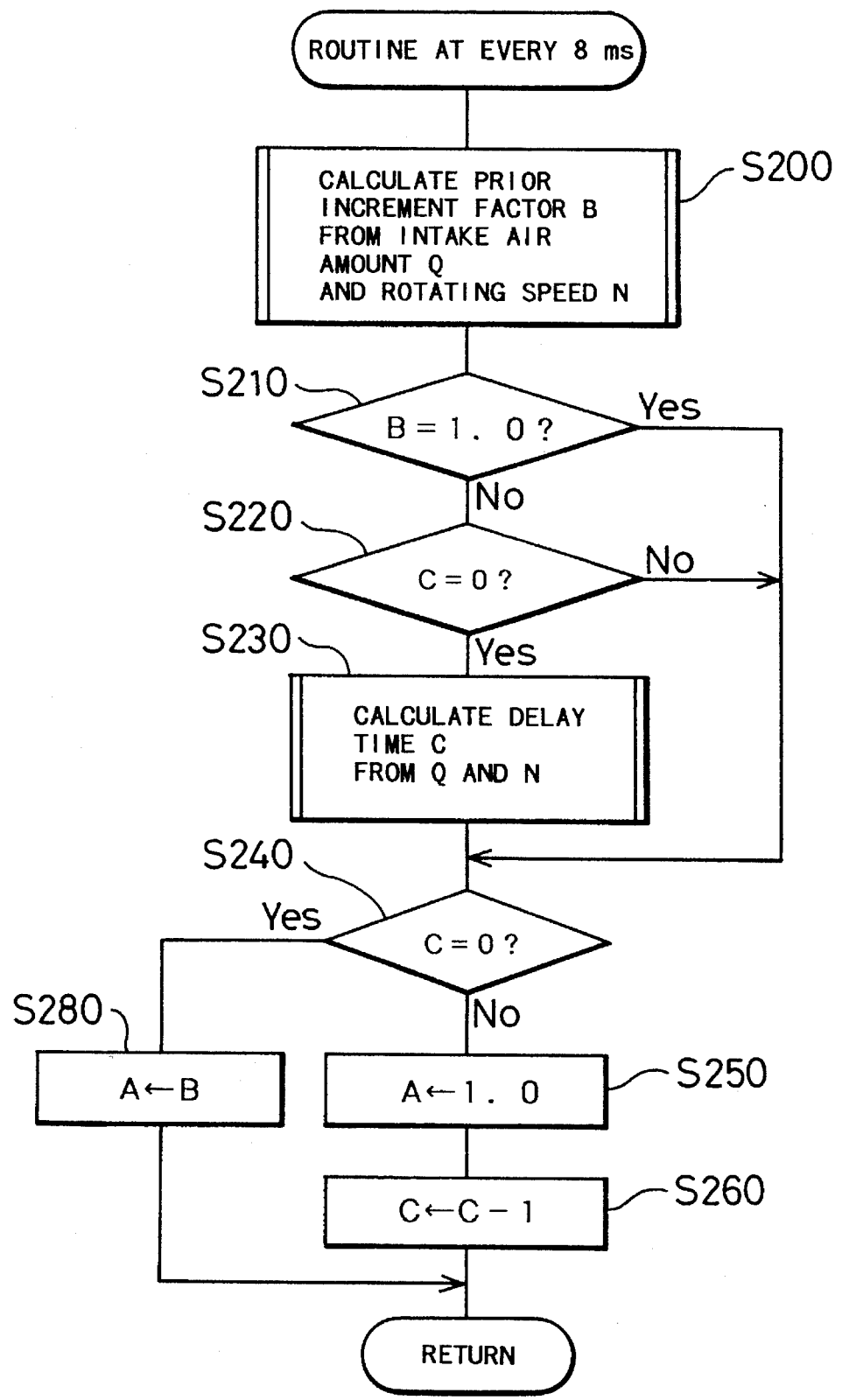
FIG. 5 is a flowchart showing a routine for determining an OTP fuel increment correction factor A based on the operating conditions of the engine 1.

Control of an fuel injection amount and ignition timing under the OTP fuel incrementing condition is described below. FIG. 5 is a flowchart showing a routine executed at every 8 milliseconds for implementing an actual OTP fuel increment. In the description below, 'A' represents the OTP fuel increment correction factor which is reflected in actual fuel injection; 'B' denotes a prior increment factor which is required for protection of exhaust-related elements under continuance of a certain operating conditions and calculated prior to an actual increment correction; and 'C' denotes a counter for measuring a delay time. As shown by step S130 in the flowchart of FIG. 3, the actual increment correction depends upon the value of the OTP fuel increment correction factor A.

When the program enters the routine of FIG. 5, the CPU 30a first calculates, at step S200, the prior increment factor B of the fuel injection amount from the rotating speed N of the engine 1 and the intake air amount Q, which represent the load of the engine 1. Although the intake air amount Q and the rotating speed N of the engine 1 are used as parameters representing the load of the engine 1 in this embodiment, other parameters, such as an intake pressure, may be used instead. When both the intake air amount Q and the rotating speed N become equal to or greater than predetermined levels due to operations of an accelerator pedal, the temperature in the engine 1 and the exhaust system will generally rise in large excess. The prior increment factor B is accordingly set equal to a value, for example, in the range of '1.1' to '1.5' depending upon the load of the engine 1.

The program proceeds to step S210 at which it is determined whether the prior increment factor B is equal to the value '1.0'. When the prior increment factor B is equal to '1.0', the program skips steps S220 and S230 and goes to step S240 which is described later. On the other hand, when the prior increment factor B is greater than the value '1.0', the program proceeds to step S220 at which it is determined whether the value on the counter C is equal to zero. When the value on the counter C is not equal to zero, the program skips step S230 and proceeds to step S240 which is described later. On the contrary, when the count on the counter C is equal to zero, on the contrary, the program goes to step S230 at which the CPU 30a determines that this is a first cycle of the routine after the requirement of increment correction and calculates a delay time from the intake air amount Q and the rotating speed N, which is subsequently set on the counter C.

In the embodiment of FIG. 5, the routine is executed at 8 millisecond intervals. For a delay time of approximately 5 seconds, an initial value of 625 would be set on the counter C. The delay time previously determined from a map (not shown) of the intake air amount Q and the rotating speed N is used according to the conditions of the engine 1 in the embodiment of FIG. 5. In another possible structure for realizing more accurate regulation, however, the temperature of exhaust gas is estimated according to the past record of the intake air amount Q and the rotating speed N, the water temperature of the engine 1, and other related conditions, and the value on the counter C is consecutively corrected to execute an increment of fuel when the estimated value reaches a predetermined level. Still another structure gradually increases the increment factor based on the estimated value or a value actually measured.

At step S240, it is determined again whether the value on the counter C is equal to zero. The value on the counter C is not equal to zero immediately after the setting of the counter C at step S230. In such a case, the program goes to step S250 at which the OTP fuel increment correction factor A is set equal to the value '1.0'. When the OTP fuel increment correction factor A is equal to the value '1.0', no OTP fuel increment is-executed according to the operation of step S130 in the flowchart of FIG. 3. After the counter C is decremented by one at step S260, the program goes to RETURN and exits from the routine.

The value on the counter C gradually decreases at every execution of the routine until the answer at step S240 becomes YES. When the value on the counter C is equal to zero at step S240, the program goes to step S280 at which the value of the prior increment factor B is substituted in the OTP fuel increment correction factor A. After the value on the counter C becomes equal to zero, a predetermined OTP fuel increment is executed according to the operation of step S130 in the flowchart of FIG. 3 using the prior increment factor B calculated from the intake air amount Q and the rotating speed N.

The routine of FIG. 5 calculates the prior increment factor B from the intake air amount Q and the rotating speed N, calculates a allowable delay time under certain engine conditions corresponding to the intake air amount Q and the rotating speed N when the prior increment factor B becomes greater than 1.0 (=0% increment), and sets the allowable delay time on the counter C. An actual OTP fuel increment is thus delayed by setting the OTP fuel increment correction factor A equal to the value 1.0 (=0% increment) until the count on the counter C becomes equal to zero.

Figure 6:
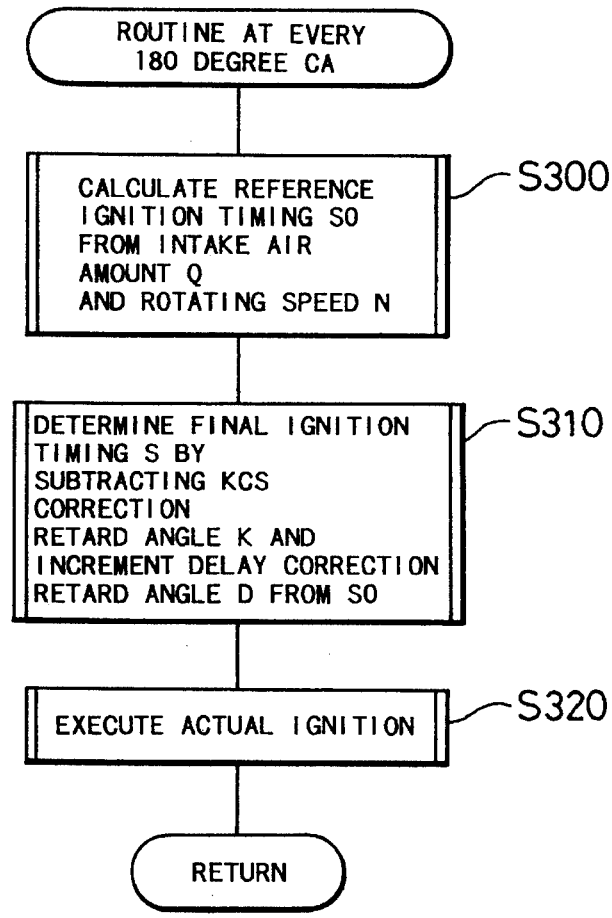
FIG. 6 is a flowchart showing a basic routine of ignition timing control.

FIG. 6 is a flowchart showing a basic routine of ignition timing control. The routine of FIG. 6 is executed at crank angles of every 180 degrees for determining an ignition timing S. When the program enters the routine, the CPU 30a first calculates, at step S300, a reference ignition timing S0 from the intake air amount Q and the rotating speed N of the engine 1, which represent the load of the engine 1. At step S310, a final ignition timing S is determined by subtracting a KCS (knock sensor)-correction retard angle K determined with the knock sensor 28 and an increment delay-correction retard angle D (hereinafter referred to as retard angle D) from the reference ignition timing S0. Namely, the final ignition timing S is determined by the equation of S =S0-K-D. Control of the ignition timing with the knock sensor 28 is hereinafter referred to as the KCS control.

At step S320, actual ignition is executed by converting the final ignition timing S determined at step S310 to a time period and setting the time period on a self-counting counter (not shown). The final ignition timing S is expressed as an angle from top dead center. An interrupting process is activated simultaneously with a time-up of the timer to actuate the igniter 16 and ignite the mixture of air and fuel.

Figure 7:
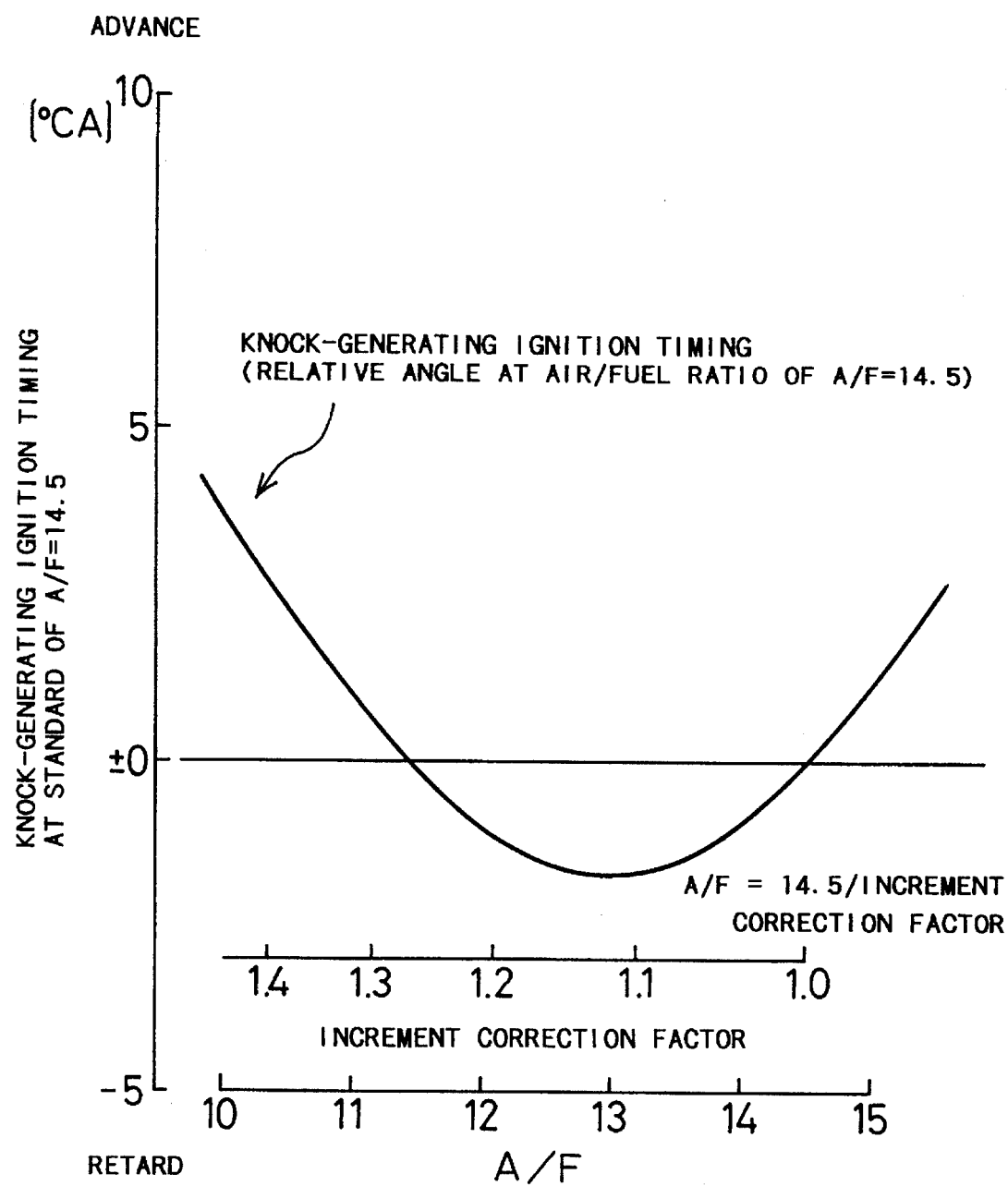
FIG. 7 is a graph showing the relationship between the air/fuel ratio and the knocking-generated ignition timing.

The relationship between the increment of fuel by the OTP fuel increment correction factor A and the ignition timing control is described according to the graph of FIG. 7, which shows the air/fuel ratio A/F plotted against the probability of knocking. Actual measurement gives a distribution of data as shown in FIG. 7 irrespective of the load or the rotating speed N of the engine. FIG. 7 does not show the absolute ignition timing but gives relative advance and retard angles under a fixed condition. A variation in the rotating speed N and the load of the engine 1 changes the knocking-generated ignition timing under the fixed air/fuel ratio. In this example, A/F=14.5 was used. Under the fixed rotating speed N and loading of the engine 1, when the air/fuel ratio A/F is shifted to a rich state e.g. 10, an advance of 3.5 degree CA is required on average to realize a critical ignition timing in which no knocking is generated, as clearly shown in FIG. 7. In other words, operation of the engine without an increment of fuel under the condition suitable for the air/fuel ratio A/F=10.0 causes a knocking. In order to cancel the knocking, an advance of 3.5 degree CA is required on average in the engine 1 having the knock control system mounted thereon.

Figure 8:
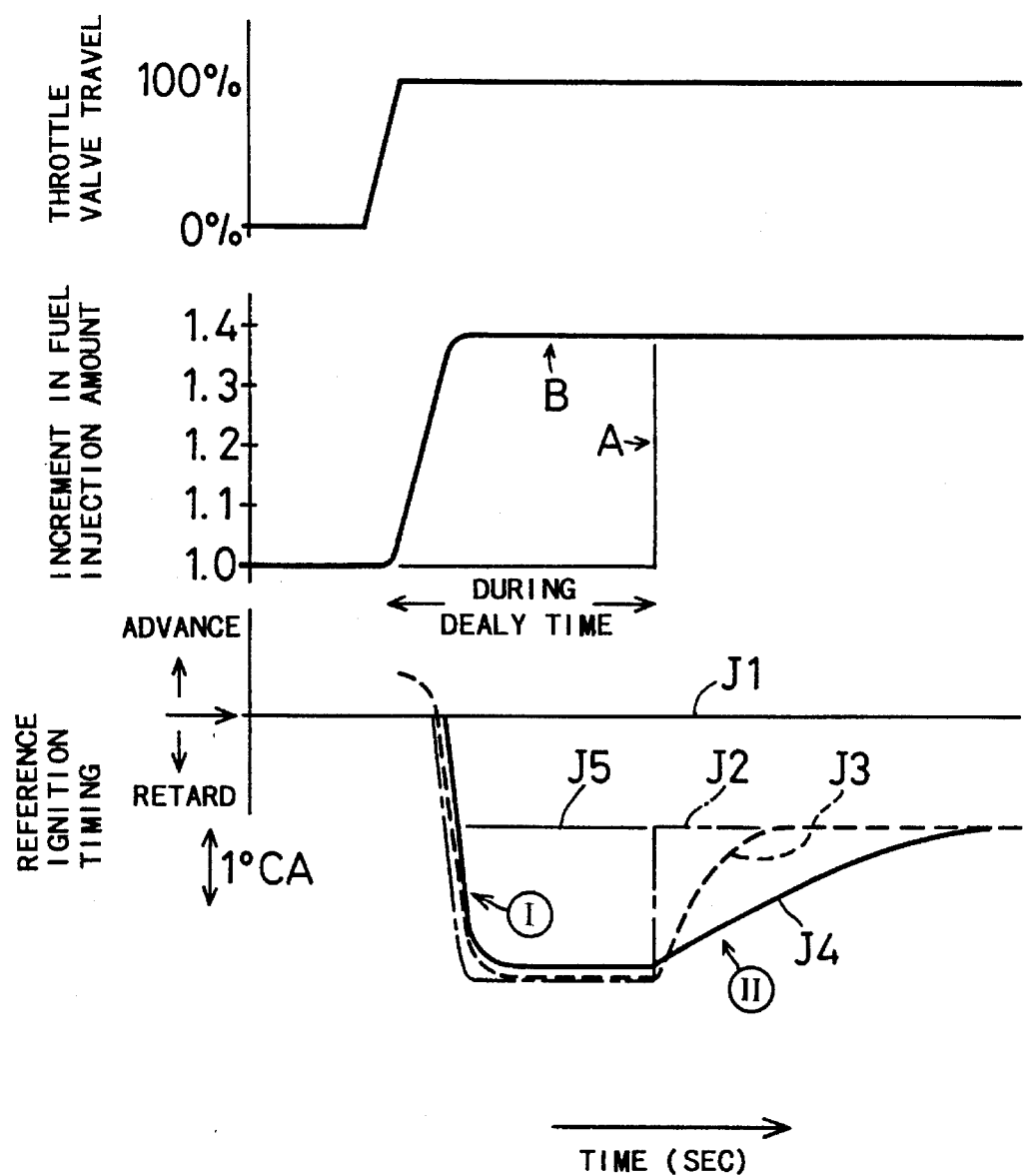
FIG. 8 shows the relationship between the throttle valve travel, the fuel increment correction factor, and the ignition timing.

Troubles which may occur in the above basic control process of fuel injection and ignition timing are described according to FIG. 8, which shows the OTP fuel increment when the throttle valve 6 is abruptly opened to 100 percent. When the throttle valve 6 is opened, the amount of air intake of the engine 1 increases after some time delay and is then saturated. When the rotating speed N of the engine does not increase but is kept constant, the prior increment factor B increases according to the intake air amount Q. The prior increment factor B required under a steady state is substantially identical with an increase in the intake air amount Q. The temperature of the exhaust-related elements does not increase promptly, and the actual increment correction is accordingly executed with the OTP fuel increment correction factor A after some time delay. In the embodiment of FIG. 8, the OTP fuel increment correction factor A is set equal to 1.0 (=no increment) during the delay time, and the value of the prior increment factor B is substituted into the OTP fuel increment correction factor A immediately after elapse of the delay time. This means that the OTP fuel increment correction factor A does not gradually increase during the delay time.

The lowest curve in FIG. 8 represents the state of the reference ignition timing S0. Since the reference ignition timing S0 is set by considering the knocking-generating condition corresponding to the loading of the engine 1, an increase in the intake air amount Q due to the abrupt-opening of the throttle valve 6 results in retarding the reference ignition timing S0. Although the actual ignition timing is further retarded by the KCS control, the reference ignition timing S0 roughly represents the ignition timing at the time of increment correction of the fuel injection amount.

When the valve travel of the throttle valve 6 is substantially equal to zero percent, no knocking occurs. Opening of the valve travel 6 to increase the intake air amount Q to a certain level gives a knocking-generating condition. Under the condition of a relatively large amount Q of intake air, an MBT (Minimum Spark Advance for Best Torque) point is close to a knock point. Especially in a high-loading range, the knock point may have a greater retard angle than the MBT point. In the engine 1 with the KCS control, a knocking-generating condition is generally set as the reference ignition timing S0.

In the graph of FIG. 8, a solid line curve J1 shows the reference ignition timing S0 and a one-dot chain line curve J2 which is plotted according to the graph of FIG. 7, represents a critical ignition timing during which knocking is generated. During the delay time when the OTP fuel increment correction factor A is delayed, knocking occurs in a retard range of 1 through 1.5 degree CA. The KCS control is accordingly executed to regulate the ignition timing to a non knocking-generating condition.

Such ignition timing control is further examined as the real behavior of the engine 1. Knocking does not occur generally before opening of the throttle valve 6 since the temperature in the combustion chamber is sufficiently low. The temperature in the combustion chamber has already increased immediately after elapse of the delay time of the OTP fuel increment correction factor A, and the increment correction of the fuel injection amount with the OTP fuel increment correction factor A does not decrease the knocking at once. The actual critical ignition timing, during which knocking is generated, is accordingly shown as a curve J3 of broken line.

Figure 9:
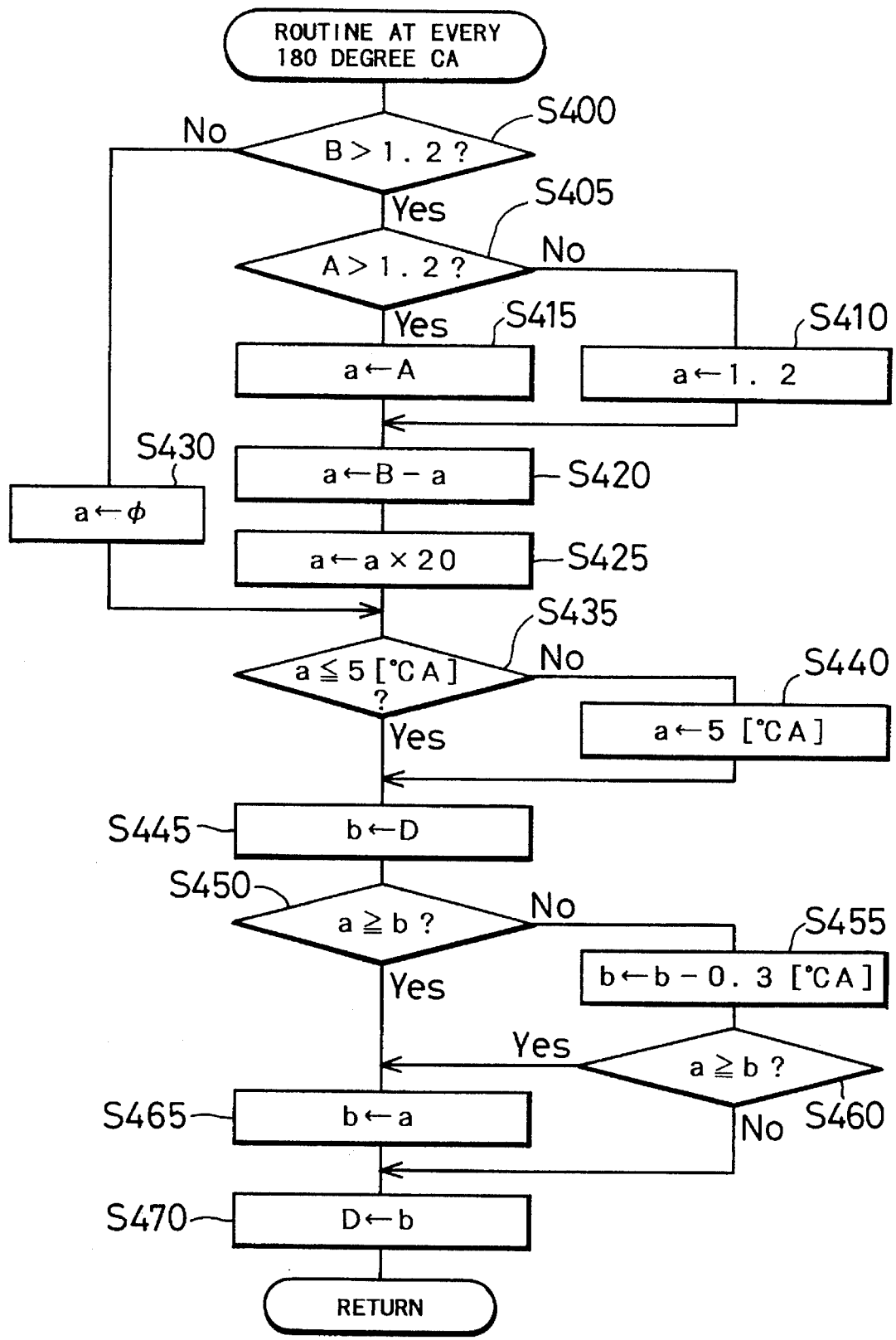
FIG. 9 is a flowchart showing an ignition timing control routine executed in the first embodiment.

In the first embodiment, an ignition timing control routine briefly shown by the flowchart of FIG. 9, is applied. Although a, b, and D may represent internal operation registers in the CPU 30a or predetermined addresses in the RAM 30c functioning as work areas, they are defined as registers in the following explanation. This routine is executed at every 180 degree CA. When the program enters the routine, it is determined at step S400 whether the prior increment factor B is greater than the value 1.2. When the throttle valve 6 is opens to require an increment of the fuel injection amount, the prior increment factor B becomes greater than the value 1.2. In such a case, the program proceeds to step S405 at which it is determined whether the OTP fuel increment correction factor A is greater than the value 1.2. Since the prior increment factor B is substituted in the OTP fuel increment correction factor A after elapse of the delay time (step S280 in the flowchart of FIG. 5), the answer at step S405 is 'NO' during the delay time. The program then goes to step S410 at which the value 1.2 is set in a register a. When both the prior increment factor B and the OTP fuel increment correction factor A exceed the value 1.2 at steps S400 and S405, the program goes to step S415 at which the CPU 30a determines an elapse of the delay time and substitutes the OTP fuel increment correction factor A in the register a.

Next, the result of the subtraction of the value on the register a from the prior increment factor B is set in the register a at step S420. Next, the value in the register a is multiplied by 20 at step S425. This process determines a difference between the prior increment factor B and the OTP fuel increment correction factor A while the value of 1.2 is defined as a threshold of the OTP fuel increment correction factor A. The correction value of ignition timing is then determined according to the difference. Since the value 1.2 is set as a threshold of the OTP fuel increment correction factor A, no specific control is executed in an increment range of 1.0 through 1.2. When the prior increment factor B is determined to be not greater than the value 1.2 at step S400, the program goes to step S430 at which the value 0 is set in the register a and subsequently to step S435. For example, when the prior increment factor B is equal to 1.4 and the OTP fuel increment correction factor A is equal to 1.0 representing the delay time, the operation at step S425 results in a=4. The operation at step S425 gives a=0 after elapse of the delay time.

Since the value in the register a is adjusted to be usable as an advance angle in the ignition timing control at step S425, it is then determined whether the value in the register a is less than or equal to 5 degree CA at step S435. When the value on the register a is greater than 5 at step S435, the program goes to step S440 at which 5 degree CA is set in the register a. The threshold value 5 of the register a corresponds to a threshold 5 degree CA of the retard angle D in the ignition timing control. This effectively prevents undesirable power drop due to excessive retard. When the correction to knocking is insufficient under such conditions, the KCS control is applied to further correct the retard angle.

Figure 10:
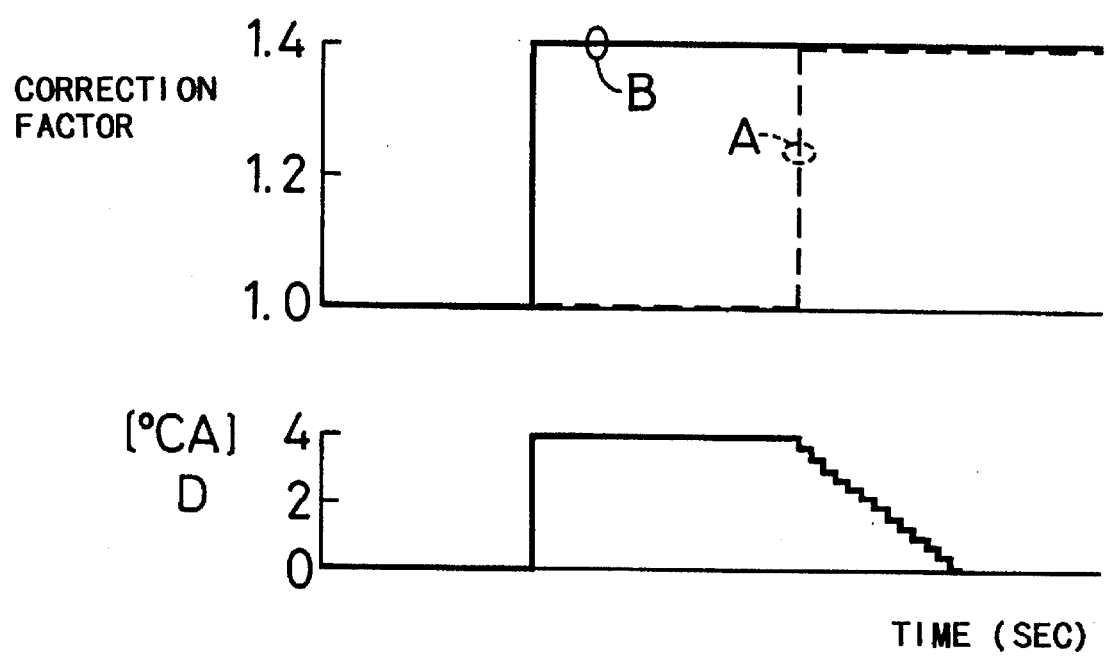
FIG. 10 shows the relationship between the operating conditions of the engine 1 and the retard angle D.

At step S445, the prior retard angle D determined in a previous cycle of the ignition timing control is set in a register b. The program then goes to step S450 at which the value in the register b is compared with the value in the register a. When the value in the register a is equal to or greater than that in the register b at step S450, the CPU 30a determines that the current retard angle calculated from the difference in this cycle is greater than the prior retard angle D determined in the previous cycle. Namely, the CPU 30a determines a start of the delay time and transfers the value on the register a to the register b at step S465. The program proceeds to step S470 at which the value in the register b is set as the current retard angle D and then goes to RETURN to exit from the routine. On the other hand, when value in the register a is smaller than that in the register b, the CPU 30a determines that the current retard angle is smaller than the prior retard angle D determined in the previous cycle. Namely, the CPU 30a determines an elapse of the delay time and subtracts the value 0.3 from the value in the register b at step S455. The comparison of the register a with the register b is then repeated at step S460. When the value in the register b after the subtraction of 0.3 is still greater than or equal to the value in the register a at step S460, that is, when the difference between the current retard angle determined in this cycle and the prior retard angle determined in the previous cycle is or equal to greater than 0.3, the program goes to step S470 at which the value b-0.3 is set as the current retard angle D, and then the program exits from the routine. When the value on the register b after the subtraction of 0.3 is smaller than the value in the register a at step S460, it is determined that the difference between the current retard angle and the prior retard angle is sufficiently small. The program then goes to step S465 at which the value in the register a is transferred to the register b. After execution of step S470 at which the value in the register b is set as the current retard angle D, the program goes to RETURN to exit from the routine. FIG. 10 shows the relationship between the prior increment factor B, the OTP fuel increment correction factor A, and the retard angle D.

As described above, the ignition timing control routine executed in the first embodiment determines the retard angle D based on the difference between the prior increment factor B representing a requirement of increment, which is determined prior to an actual increment of the fuel injection amount in response to the load of the engine 1 (the intake air amount Q and the rotating speed N), and the OTP fuel increment correction factor A for determining the actual increment of the fuel injection amount. When the increment correction is delayed for a fixed time period, the structure of the embodiment effectively prevents the ignition timing from being retarded excessively due to frequent knocking at the start of the delay time. This accordingly prevents the ignition timing from being left under the retarding condition to undesirably lower the power of the engine 1 when the delay time has elapsed and an actual increment of the fuel injection amount has been executed. The ignition timing under the conventional control condition, that is, upon condition that the ignition timing control shown in FIG. 9 is not executed, is shown by solid line curve J4 in the graph of FIG. 8. In the conventional control, the KCS control stands-by with an increase in the amount of intake air at the start of the delay time, and knocking occurring in the engine 1 causes the ignition timing to be corrected towards the retard angle. Since the KCS control does not retard the ignition timing as long as no knocking is observed, undesirable knocking occurs at a first point I in the graph of FIG. 8. When the reducing speed of the retard angle by the KCS control is relatively slow, specific troubles causing deterioration of the performance or the increase in temperature of exhaust gas may arise at a second point II.

On the other hand, in the ignition timing control according to the embodiment, the increase in retard angle immediately affects the ignition timing control (steps S450, S465, and S470 in the flowchart of FIG. 9) while the decrease in retard angle slowly affects the ignition timing control (steps S450, S455, S460, and S470 in FIG. 9). The ignition timing accordingly varies to have extremely favorable characteristics as shown by the broken line curve J3 in the graph of FIG. 8. The ignition timing control is executed on the assumption that errors of approximately 1 degree CA corrected by the KCS control do not cause knocking or other troubles and that relatively small increments such as 1.1 are not generally executed. In other words, the ignition timing control of the embodiment is generally applied to the relatively large increment (greater than or equal to 1.2).

While the ignition timing control by the KCS control only causes troubles described above with reference to FIG. 8, the same only with the retard angle D may result in inaccurate knock control. The structure of the embodiment accordingly sets the threshold of the retard angle D equal to 5 degree CA and activates the KCS control in a greater retard angle range, thus preventing undesirable power drop.

The ignition timing control of the embodiment can reduce transient knocking in the increment control of the fuel injection amount and prevents discomfort to the driver. Even under the condition of correcting the retard angle by the KCS control, the structure of the embodiment can prevent excessive retard angle control after elapse of the delay time of the increment correction, thereby realizing favorable power control and improving the fuel consumption rate. The control of the embodiment is free from the drawback of the conventional control, that is, the increase in exhaust temperature due to the excessive retard angle control, and can accordingly set a longer delay time prior to actual increment correction or otherwise reduce the increment after elapse of the delay time while sufficiently protecting the exhaust-related elements. This results in further improvement of the fuel consumption rate. Although the ignition timing control is applied to the engine 1 with the knock control function in the above embodiment, the principle of the ignition timing control is applicable to engines without knock control function. In the latter case, the advance angle of the ignition timing can be regulated during the increment according to the same principle, so as to realize the preferable power control and improve the fuel consumption rate.

Figure 11:
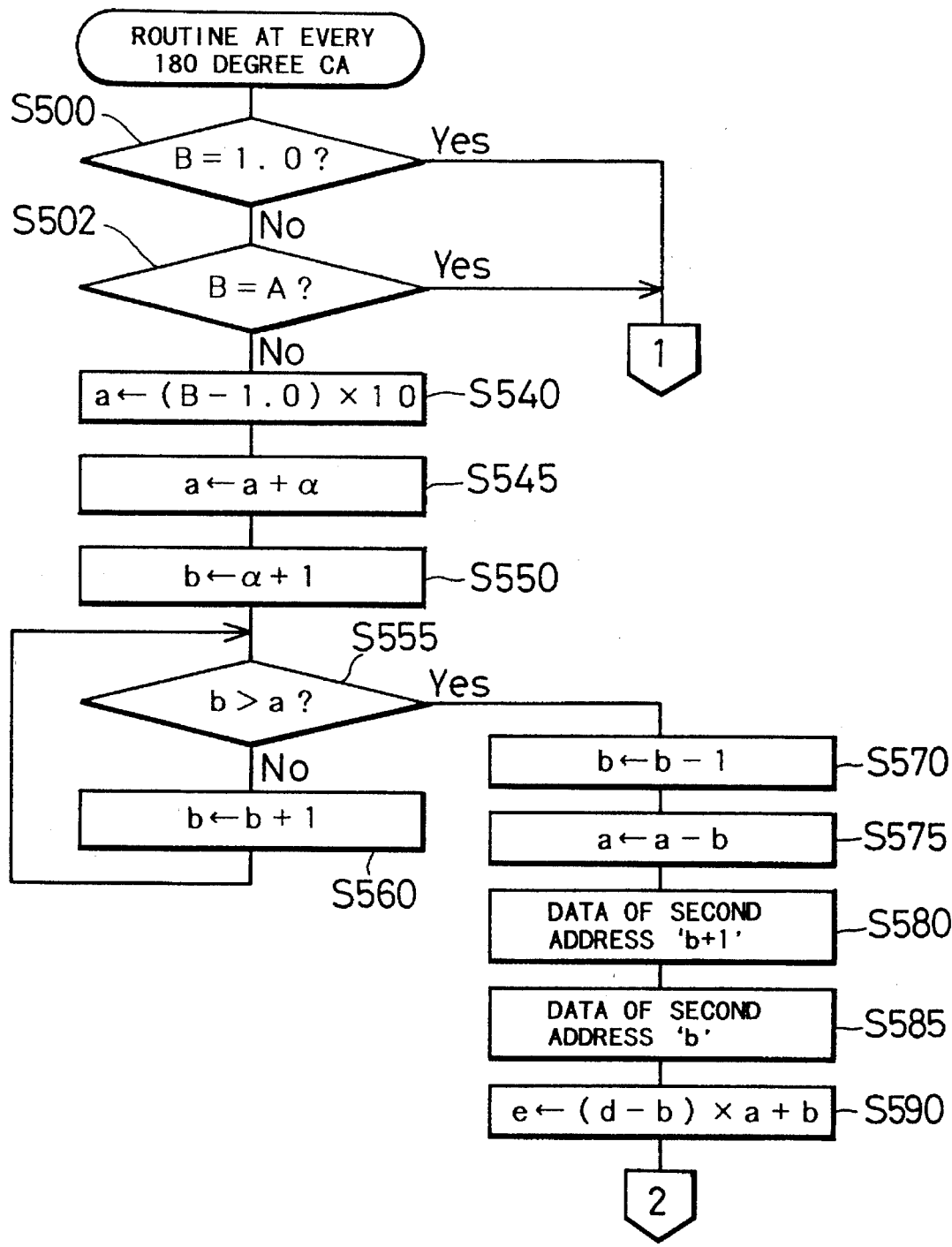
FIG. 11 is a flowchart showing a first part of an ignition timing control routine executed in a second embodiment of the invention.
Figure 12:
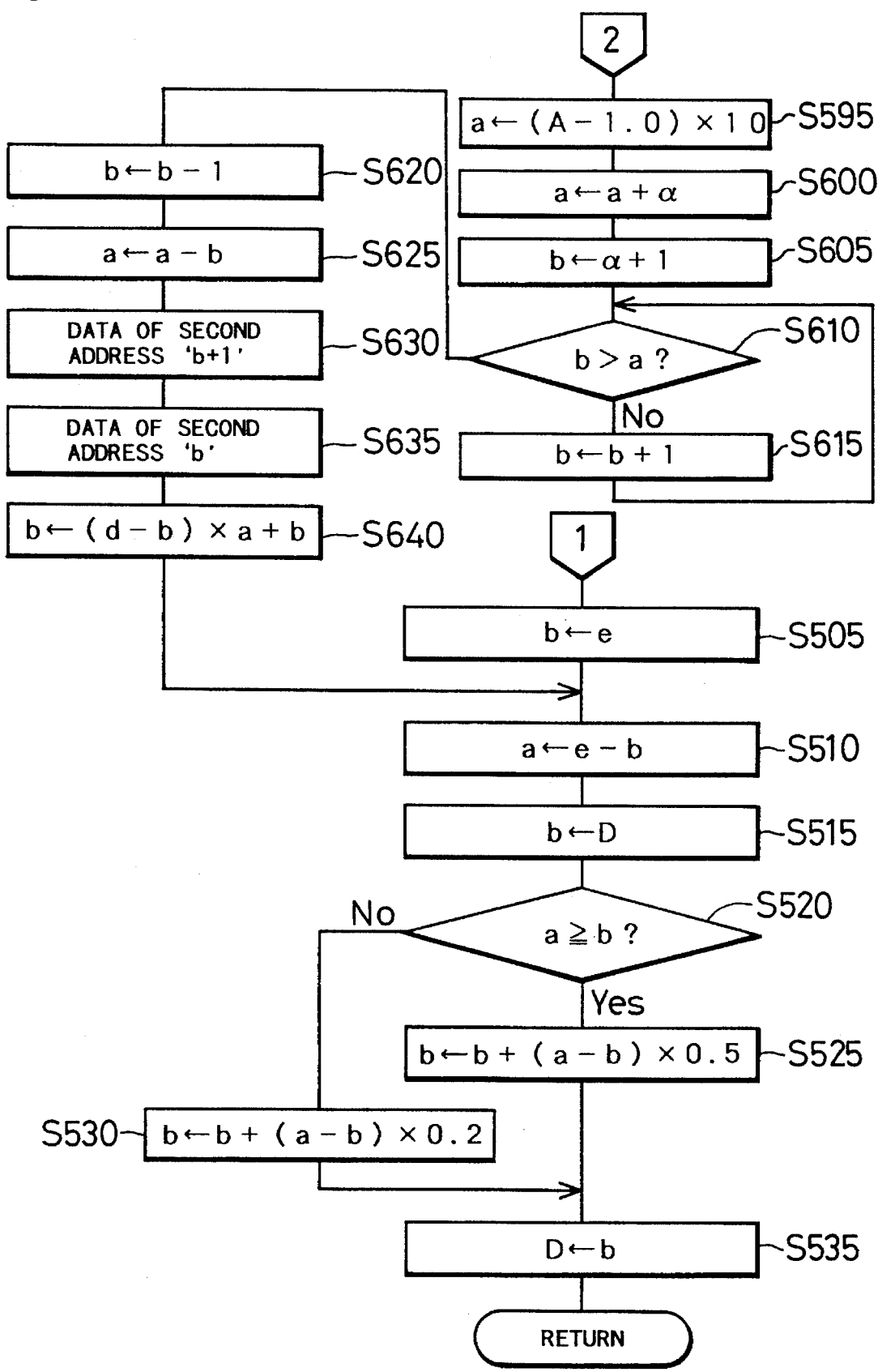
FIG. 12 is a flowchart showing a second part of the ignition timing control routine executed in the second embodiment.

FIGS. 11 and 12 are flowcharts showing another ignition timing control routine, executed instead of the 180 degree CA interrupt routine of FIG. 9, as a second embodiment of the invention. This alternative ignition timing control routine allows more precise operation and control. The ignition timing control shown in FIGS. 11 and 12 traces the one-dot chain line curve J2 (FIG. 8) by regulating the retard angle corresponding to a difference between the prior increment factor B of the fuel injection amount and the OTP fuel increment correction factor A and traces the broken line curve J3 (FIG. 8) by realizing a greater control rate during the increase in retard angle and a smaller control rate during the decrease in retard angle. This means that the KCS control is stabilized along a solid line curve J5 (FIG. 8) to effectively prevent knocking.

In the flowcharts of FIGS. 11 and 12, a, b, d, and e represent specific addresses in the RAM 30c, and a denotes a specific address on the ROM 30b for storing the relationship between the increment correction factor and the retard angle shown in FIG. 13.

When the program enters the routine, it is first determined at step S500 whether the prior increment factor B is equal to the value 1.0 and then determined at step S502 whether the prior increment factor B is identical with the OTP fuel increment correction factor A. When the answer is YES at either step S500 or step S502, the CPU 30a determines that there is no need to increment the fuel injection amount (B=1.0) or that the delay time has elapsed thus requiring increment (A=B) and the program proceeds to step S505 in the flowchart of FIG. 12.

After the value in an address a is set equal to zero at steps S505 and S510, a current retard angle D is set in an address b at step S515. The program then proceeds to step S520 at which the address a is compared with the address b. When the address b is greater than the address a, that is, when the retard angle is greater than zero, the program goes to step S530 at which the value of the address b is reduced by 20 percent. When the answer at step S500 or step S502 is YES and the process following step S505 is executed, the value of the address a is set equal to zero at steps S505 and S510 and it is determined whether the retard angle D is greater than zero at step S520. Under such conditions, the operation executed at step S530 is equivalent to the operation of b=0.8·b. When the retard angle D is equal to zero, the answer at step S520 is YES. Then the program goes to step S525 at which half the difference between the address a and the address b is added to the address b. This means that the value of the address b is kept equal to zero. After the updated value of the address b is set as a new retard angle D at step S535, the program goes to RETURN to exit from the routine.

On the other hand, the answer is NO at both steps S500 and S502 in the flowchart of FIG. 11, the CPU determines that the delay time starts with a need to increment the fuel injection amount and the program proceeds to step S540 in the flowchart of FIG. 11. The process following step S540 is roughly divided into three parts. The first part of the processing at steps S540 through S590 in the flowchart of FIG. 11 determines the probability of knocking as for the prior increment factor B and stores the result of the determination in an address e. The second part of the processing at steps S595 through S640 in the flowchart of FIG. 12 executes the above process as for the OTP fuel increment correction factor A and stores the result of determination in the address b. These processes are referred to as knock function operating processes for the prior increment factor B and the OTP fuel increment correction factor A. After the knock function calculating processes, the probability of knocking based on the prior increment factor B and the same based on the OTP fuel increment correction factor A are respectively stored in the addresses e and b. The third part of the processing at steps S510 through S535 in the flowchart of FIG. 12 described above is then executed to determine a new retard angle D with the values of the addresses e and b representing the probabilities of knocking.

Since the process of steps S540 through S590 in the flowchart of FIG. 11 is essentially identical with the process of steps S595 through S640 in the flowchart of FIG. 12, only the former knock function operating process is described here. These processes calculate the probabilities of knocking as for the prior increment factor B and the OTP fuel increment correction factor A on the assumption that the threshold (0 degree CA) of the ignition timing control with the retard angle is set in the vicinity of he air/fuel ratio A/F=13.0. The threshold is set in the vicinity of the air/fuel ratio A/F=13.0 because the retard angle becomes relatively equal to zero around the correction factor of 1.1 or the air/fuel ratio A/F of 13.0 as shown in FIG. 7.

At step S540 in the flowchart of FIG. 11, the result of the subtraction of the value 1.0 from the prior increment factor B is multiplied by ten and stored in the address a. After an address a shown in FIG. 13 is added to the address a at step S545, the address ($\alpha$+1) is stored in the address b at step S550. The program then proceeds to step S555 at which the address b is compared with the address a. The address b is incremented by one at step S560 until the address b becomes greater than the address a at step S555. The value of the address b is increased gradually from the address ($\alpha$+1) shown in FIG. 13 to a specific point where the address b is greater than the address a. When the prior increment factor B is set equal to 1.4, for example, the value of the address a is equal to ($\alpha$+4) at step S545. In this case, the address b fulfilling the condition b>a is equal to ($\alpha$+5). This means that the addresses a and b are used as pointers.

When the address b becomes greater than the address a at step S555, the program goes to step S570 at which the value of the address b is decremented by one and subsequently to step S575 at which the difference between the address a and the address b is stored in the address a. Next the data of a second address (b+1) by indirect addressing is stored in an address d at step S580, and data of a second address b is stored by indirect addressing is stored in the address b at step S585. In the above example, the data of the address ($\alpha$+4) and the address ($\alpha$+5) are stored in the addresses d and b, respectively. At step S590, the result of an operation expressed by the following equation is stored in the address e:

$$e=(d-b)\times a+b$$

The knock function operating process described above stores the result of the function, representing the probability of knocking based on the prior increment factor B, in the address e. In a similar manner, the result of the function representing the probability of knocking based on the OTP fuel increment correction factor A is stored in the address b by the process of steps S595 through S640 in the flowchart of FIG. 12. A new retard angle D is then determined according to the result of comparison between the address e and the address b (steps S510 through S535 in the flowchart of FIG. 12). In the third part of the process, the control rate in the retarding change is different from that in the advancing change (the coefficient 0.2 at step S530 and the coefficient 0.5 at step S525).

In the second embodiment of the invention, the retard angle is determined according to the difference between the probability of knocking due to the increase in the prior increment factor B and the probability of knocking due to the increase in the OTP fuel increment correction factor A. Like the first embodiment, the structure of the second embodiment prevents the ignition timing from being retarded excessively during the delay time with requirement of the increment of the fuel injection amount to the engine 1. The second embodiment uses parameters directly reflecting the probability of knocking, thus controlling the retard angle with higher accuracy than the first embodiment.

There may be many modifications, alterations, and changes without departing from the scope or spirit of essential characteristics of the invention. It is thus clearly understood that the above embodiments are only illustrative and not restrictive in any sense. For example, the principle of the invention may be applicable to a control device of an internal combustion engine where a knock sensor is not mounted there on for the KCS control.

The scope and spirit of the present invention are limited only by the terms of the appended claims.

What is claimed is:

1. A control device disposed in an internal combustion engine for controlling an air/fuel ratio of said internal combustion engine, said control device comprising:

detection means for detecting an operating condition of said internal combustion engine which affects control of said air/fuel ratio of said internal combustion engine;

means for (i) comparing the detected operating condition with a predetermined value that corresponds to a condition that the air/fuel ratio of said internal combustion engine should be made richer, and (ii) determining when the detected operating condition reaches the predetermined level;

air/fuel ratio controlling means for making the air/fuel ratio richer a fixed time period after said means for comparing determines that the detected operating condition has reached the predetermined level;

operating means for determining a parameter representing a difference between a probability of said internal combustion engine knocking before said fixed time period and a probability of said internal combustion engine knocking after said fixed time period; and ignition timing retarding means for retarding ignition timing during said fixed time period based on said parameter determined by said operation means.

2. A control device in accordance with claim 1, wherein said operation means determines said parameter based on a difference between air/fuel ratios before and after said fixed time period.

3. A control device in accordance with claim 1, wherein said operation means determines said parameter based on a difference between knocking-frequencies before and after said fixed time period.

4. A control device in accordance with claim 1, said control device further comprising:

retard angle limiting means for limiting a maximum of a retard angle controlled by said ignition timing retarding means based on said parameter.

5. A control device in accordance with claim 1, wherein said control device further comprises:

knocking detection means for detecting knocking generated in said internal combustion engine; and knocking control means, which functions independent of said ignition timing retarding means, for controlling the ignition timing of said internal combustion engine based on a frequency of the knocking detected by said knocking detection means.

6. A control device in accordance with claim 5, wherein said knocking control means further comprises:

first means for controlling ignition timing, based on said parameter determined by said operation means, in a retarding direction at a predetermined first speed at a beginning of said fixed time period; and second means for controlling ignition timing, based on said parameter determined by said operation means, in an advancing direction at a predetermined second speed, which is slower than said predetermined first speed, at an end of said fixed time period.

7. A method of controlling an air/fuel ratio of an internal combustion engine, said method comprising the steps of:

(a) detecting an operating condition of said internal combustion engine which affects control of said air/fuel ratio of said internal combustion engine;

(b) comparing the detected operating condition with a predetermined value that corresponds to a condition that the air/fuel ratio of said internal combustion engine should be made richer, and determining when the detected operating condition reaches the predetermined level;

making the air/fuel ratio richer a fixed time period after it is determined that the detected operating condition has reached the predetermined level;

(c) determining a parameter representing a difference between a probability of knocking before said fixed time period and a probability of knocking after said fixed time period; and (d) retarding ignition timing of said internal combustion engine during said fixed time period based on said parameter determined in said step (c).

8. A method in accordance with claim 7, wherein said method further comprises the steps of:

detecting knocking generated in said internal combustion engine during a time period other than said fixed time period; and controlling ignition timing of said internal combustion engine based on a frequency of the detected knocking, said step of controlling ignition timing comprising the steps of:

(1) retarding the ignition timing, based on said parameter determined in said step (c), at a predetermined first speed at a beginning of said fixed time period; and (2) advancing the ignition timing, based on said parameter determined in said step (c), at a predetermined second speed, which is slower than said predetermined first speed, at an end of said fixed time period.

9. A control device in accordance with claim 2, wherein said control device further comprises:

knocking detection means for detecting knocking generated in said internal combustion engine; and knocking control means, which functions independent of said ignition timing retarding means, for controlling the ignition timing of said internal combustion engine based on a frequency of the knocking detected by said knocking detection means.

10. A control device in accordance with claim 3, wherein said control device further comprises:

knocking detection means for detecting knocking generated in said internal combustion engine; and knocking control means, which functions independent of said ignition timing retarding means, for controlling the ignition timing of said internal combustion engine based on a frequency of the knocking detected by said knocking detection means.

11. A control device in accordance with claim 4, wherein said control device further comprises:

knocking detection means for detecting knocking generated in said internal combustion engine; and knocking control means, which functions independent of said ignition timing retarding means, for controlling the ignition timing of said internal combustion engine based on a frequency of the knocking detected by said knocking detection means.

12. A control device in accordance with claim 9, wherein said knocking control means further comprises:

first means for controlling ignition timing, based on said parameter determined by said operation means, in a retarding direction at a predetermined first speed at a beginning of said fixed time period; and second means for controlling ignition timing, based on said parameter determined by said operation means, in an advancing direction at a predetermined second speed, which is slower than said predetermined first speed, at an end of said fixed time period.

13. A control device in accordance with claim 10, wherein said knocking control means further comprises:

first means for controlling ignition timing, based on said parameter determined by said operation means, in a retarding direction at a predetermined first speed at a beginning of said fixed time period; and second means for controlling ignition timing, based on said parameter determined by said operation means, in an advancing direction at a predetermined second speed, which is slower than said predetermined first speed, at an end of said fixed time period.

14. A control device in accordance with claim 11, wherein said knocking control means further comprises:

first means for controlling ignition timing, based on said parameter determined by said operation means, in a retarding direction at a predetermined first speed at a beginning of said fixed time period; and second means for controlling ignition timing, based on said parameter determined by said operation means, in an advancing direction at a predetermined second speed, which is slower than said predetermined first speed, at an end of said fixed time period.

15. A control system disposed in an internal combustion engine for controlling an air/fuel ratio of said internal combustion engine, said control system comprising:

a sensor which detects an operating condition of said internal combustion engine which affects control of said air/fuel ratio of said internal combustion engine;

an electronic control unit, receiving the detected operating condition, functioning to:

(1) compare the detected operating condition with a predetermined value that corresponds to a condition that the air/fuel ratio of said internal combustion engine should be made richer, and determine when the detected operating condition reaches the predetermined level, (2) control a fuel injector to make the air/fuel ratio richer a fixed time period after it is determined that the detected operating condition has reached the predetermined level, (3) determine a parameter representing a difference between a probability of said internal combustion engine knocking before said fixed time period and a probability of said internal combustion engine knocking after said fixed time period, and (4) retard ignition timing during said fixed time period based on said parameter.

* * * * *

UNITED STATES PATENT AND TRADEMARK OFFICE
CERTIFICATE OF CORRECTION

PATENT NO. : 5,529,040
DATED : June 25, 1996
INVENTOR(S) : Yuki TAKEDA et al.

It is certified that error appears in the above-identified patent and that said Letters Patent is hereby corrected as shown below:

| Column | Line | |
|---|---|---|
| 1 | 53 | After "combustion" insert --engine--. |
| 3 | 25 | After "and" delete "that". |
| 3 | 65 | Change "all" to --an--. |
| 4 | 34 | Change "cylinder" to --cylinders--. |
| 5 | 39 | Change "S110" to --S110--. |
| 6 | 9 | Change "regard" to --relate to--. |
| 6 | 14 | Before "then" insert --is--. |
| 6 | 27 | Before "certain" delete "a". |
| 7 | 21 | Change "is-executed" to --is executed--. |
| 7 | 38 | After "calculates" change "a" to --an--. |
| 9 | 29 | Change "opens" to --opened--. |

UNITED STATES PATENT AND TRADEMARK OFFICE
CERTIFICATE OF CORRECTION

PATENT NO. : 5,529,040
DATED : June 25, 1996
INVENTOR(S) : Yuji TAKEDA et al.

It is certified that error appears in the above-identified patent and that said Letters Patent is hereby corrected as shown below:

| Column | Line | |
|--------|------|---|
| 10 | 23 | Before "value" insert --the--. |
| 10 | 35 | Change "or equal to greater than" to --greater than or equal to--. |
| 12 | 7 | Before "denotes" change "a" to --$\alpha$--. |
| 13 | 6 | Change "he" to --the--. |
| 13 | 13 | After "address" change "a" to --$\alpha$--. |
| 13 | 33 | Delete "is stored". |
| 14 | 8 | Change "there on" to --thereon--. |

Signed and Sealed this

Twenty-sixth Day of November 1996

BRUCE LEHMAN

*Attest:*

*Attesting Officer*        *Commissioner of Patents and Trademarks*